(12) United States Patent
Lin et al.

(10) Patent No.: US 8,696,137 B2
(45) Date of Patent: Apr. 15, 2014

(54) PICO PROJECTOR APPARATUS OF RETRO TOTAL REFLECTING TYPE TELECENTRIC OPTICAL CONFIGURATION

(75) Inventors: Ming-Kuen Lin, Yunlin County (TW); Tsung Hsun Wu, Taoyuan County (TW)

(73) Assignee: Qisda Corporation, Taoyuan County (TW)

(*) Notice: Subject to any disclaimer, the term of this patent is extended or adjusted under 35 U.S.C. 154(b) by 536 days.

(21) Appl. No.: 13/011,923

(22) Filed: Jan. 23, 2011

(65) Prior Publication Data

US 2011/0194079 A1 Aug. 11, 2011

(30) Foreign Application Priority Data

Feb. 9, 2010 (TW) .............................. 99103873 A

(51) Int. Cl.
*G03B 21/00* (2006.01)
(52) U.S. Cl.
USPC ............................................. 353/33; 353/81
(58) Field of Classification Search
USPC ................................................ 353/33, 38, 81
See application file for complete search history.

(56) References Cited

U.S. PATENT DOCUMENTS

| | | | |
|---|---|---|---|
| 6,644,815 B2* | 11/2003 | Lee ................................. | 353/84 |
| 2005/0094295 A1* | 5/2005 | Yamashita et al. ............ | 359/833 |
| 2005/0259229 A1* | 11/2005 | Lee et al. ....................... | 353/94 |
| 2006/0098096 A1* | 5/2006 | Gupta et al. .................. | 348/188 |

FOREIGN PATENT DOCUMENTS

| | | |
|---|---|---|
| CN | 1338651 A | 3/2002 |
| CN | 1628266 A | 6/2005 |
| CN | 101364037 A | 2/2009 |

* cited by examiner

*Primary Examiner* — Francis M Legasse, Jr.

(57) ABSTRACT

A high efficiency projector apparatus comprising an illumination lens set including a first illumination lens and a second illumination lens, and the image is imaged conjugatedly on the image projection lens set, when light traveling distance between the first illumination lens of focal distance f1 and the second illumination lens of focal distance f2 is "d", light source module produces first multiple virtual light sources on output side of light beam homogenization means, first multiple virtual light sources are located within f1 producing virtual image of second multiple virtual light sources on same side as the first multiple virtual light sources, the second multiple virtual light sources are distanced from the second illumination lens by value of D, the D value has value according to (f2<D<2f2), such that the second multiple virtual light sources are substantially conjugatedly imaged on the image projection lens set.

9 Claims, 4 Drawing Sheets

PICO PROJECTOR APPARATUS OF RETRO TOTAL REFLECTING TYPE TELECENTRIC OPTICAL CONFIGURATION

CROSS-REFERENCE TO RELATED APPLICATION

This utility application claims priority to Taiwan Application Serial 099103873, filed Feb. 9, 2010, which is incorporated herein by reference.

BACKGROUND OF THE INVENTION

1. Field of the Invention

The invention relates to a projector apparatus, and in particular, to the light path design of pico projector apparatus.

2. Description of the Prior Art

In recent years, the projection apparatuses usually used by the corporate market are gradually getting into the household market or personal market. For applications of personal portable products, the volume size of projection apparatus and the efficiency of optical engine therein are important issues, and, more particularly, the specific angle of incidence required by the reflection-type image generator built in the projector apparatus needs to be considered to tradeoff between the volume size and the optical engine efficiency.

In order to reduce the size, the pico projector apparatus usually implements design of an LED light source module along with single light path. However, one of the drawbacks is insufficiency of brightness. To enhance the brightness, implementing two (or more) light source modules together with the dichroic combiner forming a single light path could not effectively reduce the volume of apparatus. For instance, the light combination techniques used by U.S. patent application No. US 2006/0279710 A1, US 2006/0164600 A1 or issued U.S. Pat. No. 6,644,814 B2 would result in a larger size of pico projector apparatus. Accordingly, it is desired to provide a pico projector apparatus which satisfy both requirements of smaller size and higher efficiency of optical engine.

To optimize the optical engine efficiency and volume size of pico projector apparatus at the same time, usually the following factors must be balanced: 1. Minimum of light paths, 2. Conjugate imaging of optical design, 3. Minimum folded size of light path.

SUMMARY OF THE INVENTION

A main objective of invention is to provide a projection apparatus or an optical module having an expected size of volume and an expected efficiency of optical engine.

The other objective of invention is to provide a pico projector apparatus or an optical module realizing the conjugate imaging.

Still another objective of invention is to provide a pico projector apparatus or an optical module having two LED light paths.

To reach the above objectives, in one embodiment of invention, a retro total reflecting type telecentric optical configuration is provided.

Specifically, the retro total reflecting type telecentric optical configuration includes a prism set, wherein the prism set includes a first prism. The first prism includes a main light inputting plane and a main light outputting plane, an intersecting angle between the main light inputting plane and a vertical reference plane being a first angle, an intersecting angle between the main light outputting plane and the vertical reference plane being a second angle. The first angle is about 28(±3) degrees and the second angle is about 32(±3) degrees, in order to meet the requirement as to the light incidence angle of reflection-type image generator. In addition, the height (thickness) (i.e., in Y direction) difference between the prism set and reflection-type image generator is reduced as well.

To achieve the above objectives, the projector apparatus of the embodiment of invention for projecting an image to a surface, comprising a light source module, a dichroic combiner, a light beam homogenization means, an illumination lens set, a reflection-type image generator, a prism set, and an image projection lens set. The light source module has a first light source, a second light source, a first light source modulation lens, a second light source modulation lens. The first light source becomes a first modulated light after going through the first light source modulation lens, and the second light source becomes a second modulated light after passing through the second light source modulation lens. The dichroic combiner combines the first modulated light and the second modulated light for generating a single first light path which defines a first direction. The light beam homogenization means functions to render the first light path uniformized. The illumination lens set functions to guide the uniformized first light path to a second light path. The reflection-type image generator forms the image and the prism set guides the second light path to the reflection-type image generator. A third light path having the image is formed after the reflection-type image generator reflects the second light path and the third light path is reflected by the prism set to form a fourth light path. The image projection lens set, located on the fourth light path, projects the image onto the surface. The light path formed by the second light source defining a second direction which is substantially perpendicular to the first direction. With respect to the second direction, the second light source is disposed between the first light source and the image projection lens set. Wherein, according to a predetermined imaging relationship, the light distributed on the light beam homogenization means is imaged conjugatedly on the image projection lens by the illumination lens.

Other than the first embodiment, the second embodiment of invention is a projector apparatus for projecting an image onto a surface, comprising: a light source module, a dichroic combiner, a light beam homogenization means, an illumination lens set, a reflection-type image generator, a prism set, and an image projection lens set. The light source module includes a first light source, a second light source, a first light source modulation lens, and a second light source modulation lens. The first light source irradiates the first light source modulation lens and outputs the first modulated light, the second light source irradiates the second light source modulation lens and output the second modulated light. The dichroic combiner generates a single first light path by combining the first modulated light and the second modulated light, and the first light path defines a longitudinal direction. The light beam homogenization means, inputting the first light path, performing uniformized effect over the first light path. The illumination lens set, inputting the uniformized first light path, redirects the uniformized first light path to a second light path, and an included angle is formed between the first light path and the second light path. The illumination lens set includes a first illumination lens, a direction guider and a second illumination lens. The direction guider functions to redirect the first light path to the second light path, and the focal distance of the first illumination lens is f1, the focal distance of the second illumination lens is f2. The reflection-type image generator forms the image and the prism set, inputting the second light path, projects the second light path to the reflection-type image generator. The reflection-type image generator generates a third light path having the image after reflecting the second light path. The third light path, after being reflected by the prism set, forms a fourth light path. The image projection lens set, located on the fourth light path, projects the image onto the surface. The light path emitted by the second light source defining a transverse direction which is substantially perpendicular to the first light path, and, with respect to the transverse direction, the second light source is located between the first light source and the image projection lens set. The illumination lens set, based on an imaging formula, renders the light distributed on the light beam homogenization means conjugatedly imaged on the image projection lens set. The effective focal distance of the first illumination lens and the second illumination lens is d, and the light source module generates a first multiple virtual light sources on an output side of the light beam homogenization means. The imaging relationship is: the first multiple virtual light sources are located within focal distance f1 of the first illumination lens producing an virtual image of a second multiple virtual light sources on the same side as the first multiple virtual light sources, and the second multiple virtual light sources are distanced from the second illumination lens by value of D, wherein the D value has a value according to (f2<D<2f2) such that the second multiple virtual light sources are substantially conjugatedly image on the image projection lens set.

According to one embodiment, the reflection-type image generator is a digital micromirror device having a plurality of micromirror units. Each of the micromirror units, responsive to a controlling signal, flips to different state with respect to an axis.

The above summary of the embodiments does not intend to cover all possible variations or alterations or every aspects of the present invention.

Under the core inventive spirit recited above, more specific embodiments can be contrived.

BRIEF DESCRIPTION OF THE APPENDED DRAWINGS

Each illustrated embodiment of the present invention will be fully understood with reference to the following description in details and the attached drawings.

FIG. 1 discloses a projector apparatus according to the first embodiment of the invention.

FIG. 2a discloses the first prism of FIG. 1 in perspective view.

FIG. 2b discloses the right-side view of the first prism of FIG. 2a.

FIG. 2c discloses the top-side view of the first prism of FIG. 2a.

DETAILED DESCRIPTION OF THE INVENTION

The following exemplary embodiments of the present invention will be further described with reference to the attached drawings. While the present invention has been described with reference to exemplary embodiments, it is understood that various changes and modifications may be made and the invention is not limited to the disclosed exemplary embodiments that are use to enable persons skilled in the art to practice the present invention.

In the first embodiment of the present invention, it provides a projector apparatus for projecting an image onto a surface for people to view the content or information within the image. The projector apparatus may be a stand alone projector or an optical module integrated in a portable apparatus, such as a cellular phone, to become a portable multi-functional apparatus, such as a cellular phone with the function of pico projection.

In the following recitations, the so-called [light path] means the path on which the light (with or without image) traveling through and the light per se. The light per se might not include any information, or, due to some image processing operation, e.g. by the reflection-type image generator, the light might include the information to be projected and displayed. For easy understanding and readability for the figures in this specification, only the main light beam line on the light path is shown and other non-main light beam lines are not shown for brevity.

In the following recitations, the so-called [conjugate imaging] means the output pupil plane of an upstream (previous) optical lens is substantially imaged on the input pupil plane of a downstream (subsequent) optical lens.

Figure 1:
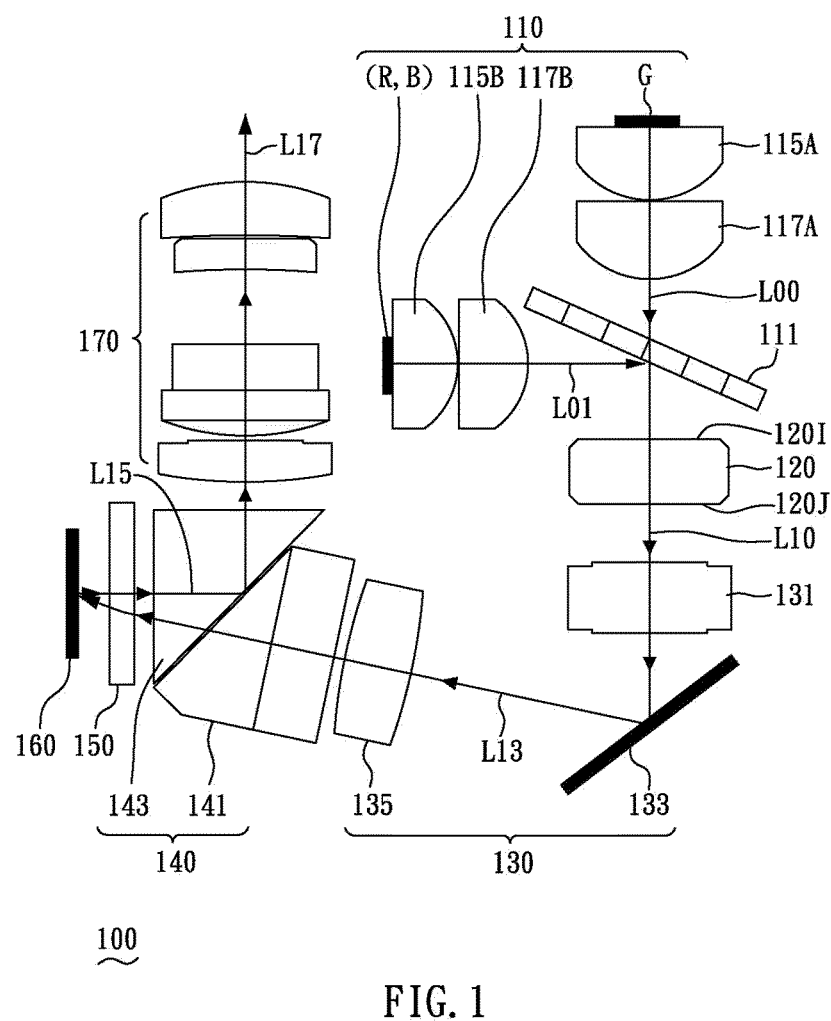

As shown in FIG. 1, in the first embodiment of invention, a projector apparatus 100 includes a light source module 110 having a first light source (e.g. LED green light, G), a second light source (e.g. LED red light R and blue light, B), a first light source modulation lens (for example, collimator 115A, 117A), a second light source modulation lens (for example, collimator 115B, 117B). The first light source is converted to the first modulated light L00, after passing through the first light source modulation lens. Similarly, the second light source is converted to the second modulated light L01, after passing through the second light source modulation lens.

The projector apparatus 100 further includes a dichroic combiner 111, for combining the first modulated light L00 and the second modulated light L01 to form a single first light path L10, wherein the single first light path L10 defines a first direction as indicated in FIG. 1. The projector apparatus 100 further includes a light beam homogenization means (or, beam homogenizer) 120 for uniformizing the first light path L10.

The projector apparatus 100 further includes an illumination lens set 130, inputting the uniformized first light path L10, for redirecting the first light path L10 to a second light path L13. The first light path L10 and the second light path L13 intersects with each other at an included angle.

The projector apparatus 100 further includes a reflection-type image generator 160 for forming the image thereon and a prism set 140, inputting the second light path L13, for projecting the second light path L13 to the reflection-type image generator 160. The reflection-type image generator 160, after reflecting the second light path L13, forms a third light path L15 having the image therein. The third light path L15, having the image, is totally reflected by the prism set 140 to generate a fourth light path L17 with the image therein.

The projector apparatus 100 further includes an image projection lens set 170, located on the fourth light path L17, for projecting the image in the fourth light path L17 onto the surface.

As indicated in FIG. 1, to raise the brightness of light source, LED light source of the embodiment employs two-path light configuration. The LED G light constitutes one light path, and LED B light together with the LED R light constitutes another light path. The two light paths then go through the dichroic combiner 111, which forms single first light path L10.

The first and second light source modulation lens (115A, 117A, and 115B, 117B) respectively input the light generated by G and (R, B) light source, and output the light path L00, L01. The first and second light source modulation lens (115A, 117A, and 115B, 117B) also provides a function to homogenize distributions of the angles of illumination. An embodiment of the first and second light source modulation lens includes a prior art collimator.

In one embodiment, the light path L00 corresponding to first light source is substantially parallel to the first light path L10, and the light path L01 corresponding to the second light source is substantially perpendicular to the first light path L10. The second light source along with the second light source modulation lens 115B, 117B is disposed between the first light source and the image projection lens set 170, as shown in FIG. 1.

Under the embodiment shown in FIG. 1, the light beam homogenization means 120, for example, includes a lenslet array which forms a light inputting plane 120I and a light outputting plane 120J. The light inputting plane 120I is imaged on the reflection-type image generator 160. As understood by persons skilled in this art the lenslet array includes a plurality of lenslets on a common plane, and each lenslet typically has an identical focal distance.

Under the embodiment shown in FIG. 1, the curvature radius of each lenslet of lenslet array, for example, is about smaller than 2 for better uniformization. After the first light path L10 leaves the light beam homogenization means 120, it irradiates onto the illumination lens set 130, which redirects the first light path L10 to a second light path L13. The first light path L10 and the second light path L13 intersects with each other at an included angle.

The illumination lens set 130 mainly includes an illumination lens 131, 135 and a direction guider 133. The direction guider 133 functions to direct the first light path L10 to a second light path L13. The direction guider 133 is, for example but not limited to, a reflecting surface. As known to persons skilled in the arts, the principle function of illumination lens 131, 135 is to minimize the unevenness of the intensity distribution of the light illumination. One embodiment for the illumination lens 131 or illumination lens 135 can be a conventional condenser lens, which aligns the main light beam line to be parallel to the light axis of the projector apparatus and, therefore, reduces the possible deviation of light.

Figure 2A:
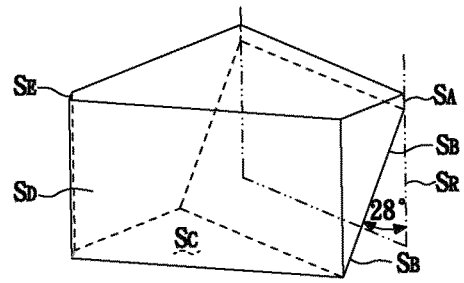
Figure 2B:
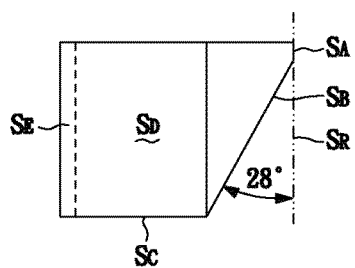
Figure 2C:
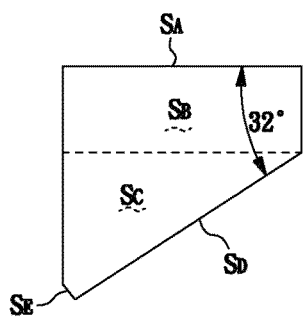

Under the embodiment shown in FIG. 1, in one embodiment, the prism set 140 includes a first prism 141 having a main light input plane SB and a main light output plane SD, as shown in FIGS. 2a, 2b and 2c. An included angle between the main light input plane SB and a vertical reference plane SR is a first angle, an included angle between the main light output plane SD and the vertical reference plane SR is a second angle. The first angle is about 28 (±3) degrees, the second angle is about 32 (±3) degrees to meet the requirement for the light incidence angle of reflection-type image generator 160. In one embodiment, the prism set 140 includes a second prism 143 which is a total internal reflection (TIR) prism. It is noted that the second light path L13 passes through the first prism 141 first, and then is reflected by the reflection-type image generator 160 for retrieving the information to be projected. Afterwards, the third light path L15 is formed and then totally reflected by the second prism 143. Afterwards, the fourth light path L17 is produced, and therefore the configuration in which the prism set 140 is applied is called as "retro total internal reflection telecentric" optical configuration.

As shown in FIGS. 2a, 2b, 2c illustrating the embodiment for the first prism 141, the light enters through the input plane SB and leaves from the output plane SD. The parameters disclosed and described above for the first prism 141 (and/or the second prism 143) are only preferred embodiments. Other equivalent parameters can be employed for satisfying the requirement of the light incidence angle of the reflection-type image generator 160, and reducing the height (thickness) (i.e., in Y direction) difference between the prism set 140 and reflection-type image generator 160.

Referring back to FIG. 1, in one embodiment under configuration of FIG. 1, the reflection-type image generator 160 for example can be a digital micromirrors device (DMD). The front side of reflection-type image generator 160 is typically provided with a field lens 150 which functions to increase the viewing angle.

Referring back to FIG. 1 again, the third light path L15 having the projection information therein is totally reflected by the second prism 143 to form the fourth light path L17. The fourth light path L17 passes through the image projection lens set 170 which projects the information onto a surface. The image projection lens set 170 generally includes multiple lenses of different functions to achieve accurate magnification and projection.

Figure 3:
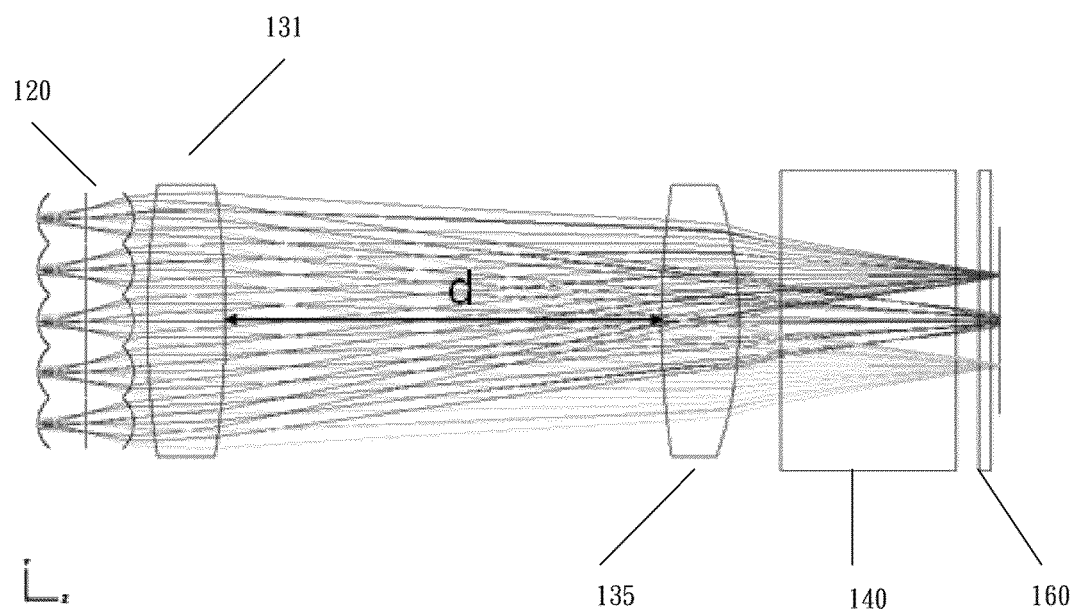
FIG. 3 shows that the lenslet on the first plane of the light beam homogenizer 120 is imaged on the image generator 160.
Figure 4:
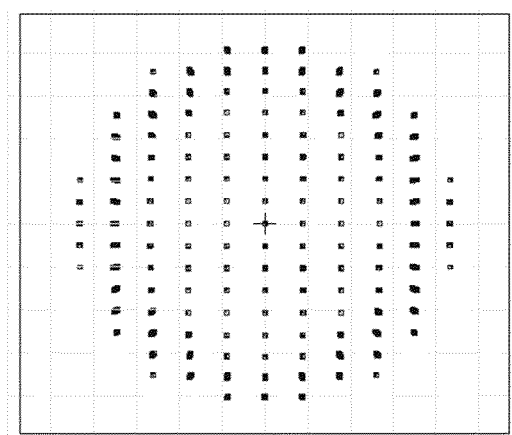
FIG. 4 shows the first multiple virtual light sources at the output side of the light beam homogenizer 120 according to the invention.
Figure 5:
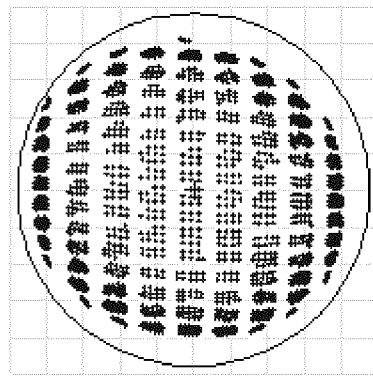
FIG. 5 shows the third multiple virtual light sources formed at the input pupil of the projection lens set 170.

In the followings, how to achieve the conjugate imaging by the optical design of this invention is explained with assistance of FIGS. 3, 4 and 5.

It is emphasized here that FIG. 3 is a figure indicating the effective (equivalent) light path diagram of FIG. 1. From left to right, the light beam homogenization means (or, light beam homogenizer) 120, the illumination lens 131, the illumination lens 135, the prism set 140, the reflection-type image generator 160 are disclosed. It indicates the effective light traveling distance between the illumination lens 131 and the illumination lens 135 is "d". In addition, in FIG. 3, it is also disclosed that the lenslet on input plane 120I of the light beam homogenization means 120 is such designed that it is imaged on the reflection-type image generator 160. In order to be imaged conjugately on the image projection lens set 170, the effective light traveling distance "d" within the illumination lens set 130 must be effectively augmented. To advantageously utilize a space, which is resulted due to effective light traveling distance d, along a direction about perpendicular to light path L10, in the shown embodiment, the second light source (R, B) and the second light source modulation lens set (115B, 117B) are disposed between the first light source (G) and the image projection lens set 170.

FIG. 4 discloses the first multiple virtual light sources at the output side 120J of light beam homogenization means 120. As the corresponding light emitted is modulated to become a substantial parallel light via the first and second light source modulation lens sets (115A, 117A, 115B, 117B), two light paths are combined by the dichroic combiner 111 into a first light path L10. The light produces a first multiple virtual light sources at the output side 120J of homogenizer 120. The first multiple virtual light sources are imaged on the vicinity of input pupil of illumination lens 131 and the first multiple virtual light sources are located within the focal distance (f1) of first illumination lens 131. This optical relationship produces a virtual image of a second multiple virtual light sources which, with respect to the first illumination lens 131, are on the same side of the first multiple virtual light sources. In other word, the virtual image of second multiple virtual light sources are distanced from the second lens 135 by amount of D which is larger than "d". In one embodiment, the imaging formula (relationship) is f2<D<2f2, wherein f2 is the focal distance of the second illumination lens 135, rendering the second multiple virtual light sources be substantially conjugated imaged on the image projection lens set. As a result, the configuration of embodiment of invention forms a third multiple virtual light sources at the vicinity of input pupil of image projection lens set 170.

FIG. 5 shows the third multiple virtual light sources images formed at the input pupil of the image projection lens set 170.

By the above detailed descriptions for the preferred embodiment, it is therefore understood that all objectives of the present invention are realized by those embodiments. In other words, via the retro total reflection telecentric optical configuration, the present invention can provide a smaller size projector apparatus or module which has higher optical engine efficiency. The present invention also realizes the conjugate imaging within the pico projector apparatus or module of the invention. The present invention also realizes two light paths of LED light within the pico projector apparatus or module.

While the present invention has been shown and described with reference to the preferred embodiments thereof and in terms of the illustrative drawings, it should not be interpreted as limited thereby. Various possible modifications and alterations could be conceived of by one skilled in the art to the form and the content of any particular embodiment, without departing from the scope and the spirit of the present invention. Such modifications or alternations are also the scope the following claims intend to cover.

What is claimed is:

1. A projector apparatus for projecting an image to a surface, comprising:
    a light source module, having a first light source generating a first light, a second light source for generating a second light, a first light source modulation lens and a second light source modulation lens, the first light being converted to a first modulated light by the first light source modulation lens, the second light being converted to a second modulated light by the second light source modulation lens;
    a dichroic combiner, combining the first modulated light and the second modulated light, for generating a single first light path which defines a first direction;
    a light beam homogenization means for rendering the first light path uniformized;
    an illumination lens set for guiding the uniformized first light path to a second light path;
    a reflection-type image generator for forming the image;
    a prism set for guiding the second light path to the reflection-type image generator, wherein a third light path having the image therein is formed after the reflection-type image generator reflects the second light path, and the third light path is reflected by the prism set forming a fourth light path;
    an image projection lens set, located on the fourth light path, for projecting the image onto the surface, wherein the light path formed by the second light defining a second direction which is substantially perpendicular to the first direction, and, with respect to the second direction, the second light source is disposed between the first light source and the image projection lens set, and wherein, the light distributed on the light beam homogenization means is imaged conjugatedly on the image projection lens by the illumination lens according to a predetermined imaging relationship;
    wherein the prism set comprises a first prism, and wherein the first prism includes a main light inputting plane and a main light outputting plane, an intersecting angle between the main light inputting plane and a vertical reference plane being a first angle, an intersecting angle between the main light outputting plane and the vertical reference plane being a second angle, the first angle is about 25-31 degrees and the second angle is about 29-35 degrees to provide a required light incidence angle of the reflection-type image generator;
    wherein the illumination lens set includes a first illumination lens, a direction guider and a second illumination lens, the direction guider functions to redirect the first light path to the second light path, wherein the image is imaged conjugatedly on the image projection lens set, when the light traveling distance between the first illumination lens and the second illumination lens is "d" and wherein focal distance of the first illumination lens is f1, focal distance of the second illumination lens is f2, the light source module produces a first multiple virtual light sources on an output side of the light beam homogenization means, the first multiple virtual light sources are located within focal distance f1 producing an virtual image of a second multiple virtual light sources on the same side as the first multiple virtual light sources, the second multiple virtual light sources are distanced from the second illumination lens by value of D, wherein the D value has a value according to (f2<D<2f2), such that the second multiple virtual light sources are substantially conjugatedly image on the image projection lens set.

2. The projector apparatus of claim 1, wherein the light beam homogenization means comprises a lenslet array, the lenslet array forming a light inputting plane and the light inputting plane is imaged on the reflection-type image generator.

3. The projector apparatus of claim 1, wherein the prism set includes a second prism, and wherein the second prism is a total internal reflection (TIR) prism.

4. The projector apparatus of claim 1, wherein the first light source includes LED Green light, the second light source includes LED Red and Blue lights.

5. The projector apparatus of claim 1, wherein the second light source is disposed at a space between the first light source and the image projection lens set.

6. A projector apparatus for projecting an image onto a surface, comprising:
    a light source module including a first light source for generating a first light, a second light source for generating a second light defining a light path, a first light source modulation lens and a second light source modulation lens, the first light source irradiates the first light source modulation lens and outputs the first modulated light, the second light source irradiates the second light source modulation lens and outputs the second modulated light;
    a dichroic combiner for generating a single first light path by combining the first modulated light and the second modulated light, the first light path defining a longitudinal direction;
    a light beam homogenization means, inputting the first light path, for performing uniformized effect over the first light path;
    an illumination lens set, inputting the uniformized first light path, for redirecting the uniformized first light path to a second light path, an included angle is formed between the first light path and the second light path, and wherein the illumination lens set includes a first illumination lens, a direction guider and a second illumination lens, the direction guider functions to redirect the first light path to the second light path, the focal distance of the first illumination lens being f1, the focal distance of the second illumination lens being f2, wherein the image is imaged conjugatedly on the image projection lens set, when an effective focal distance of the first illumination lens and the second illumination lens is "d";

a reflection-type image generator for forming the image;

a prism set, inputting the second light path, for projecting the second light path to the reflection-type image generator, wherein, the reflection-type image generator generates a third light path having the image therein after reflecting the second light path, and the third light path, after being reflected by the prism set, forming a fourth light path;

an image projection lens set, located on the fourth light path, for projecting the image onto the surface, wherein the light path of the second light defining a transverse direction which is substantially perpendicular to the first light path, and with respect to the transverse direction, the second light source is located between the first light source and the image projection lens set, and wherein the illumination lens set, based on an imaging formula, renders the light distributed on the light beam homogenization means conjugatedly imaged on the image projection lens set, the light source module generates a first multiple virtual light sources on an output side of the light beam homogenization means, and wherein the first multiple virtual light sources are located within focal distance f1 producing a virtual image of a second multiple virtual light sources on the same side as the first multiple virtual light sources, the second multiple virtual light sources are distanced from the second illumination lens by value of D, wherein the D value has a value according to (f2<D<2f2), such that the second multiple virtual light sources are substantially conjugatedly image on the image projection lens set.

7. A projector apparatus for projecting an image to a surface, comprising:

a light source module having a first light source for generating a first light, a second light source for generating a second light defining a light path, a first light source modulation lens and a second light source modulation lens, the first light being converted to a first modulated light after going through the first light source modulation lens, the second light source being converted to a second modulated light after passing through the second light source modulation lens;

a dichroic combiner, combining the first modulated light and the second modulated light, for generating a single first light path which defines a first direction;

a light beam homogenization means for rendering the first light path uniformized;

an illumination lens set for guiding the uniformized first light path to a second light path, and the illumination lens set including a first illumination lens, a direction guider and a second illumination lens, the direction guider functions to redirect the first light path to the second light path, wherein the image is imaged conjugatedly on the image projection lens set, when the light traveling distance between the first illumination lens and the second illumination lens is "d";

a reflection-type image generator for forming the image;

a prism set for guiding the second light path to the reflection-type image generator, wherein a third light path having the image therein is formed after the reflection-type image generator reflects the second light path, and the third light path is reflected by the prism set forming a fourth light path;

an image projection lens set, located on the fourth light path, for projecting the image onto the surface, wherein the light path of the second light defining a second direction, the second direction being substantially perpendicular to the first direction, and with respect to the second direction, the second light source is disposed between the first light source and the image projection lens set, wherein the light distributed on the light beam homogenization means are imaged conjugatedly on the image projection lens by the illumination lens according to a predetermined imaging relationship;

wherein the prism set comprises a first prism, and wherein the first prism includes a main light inputting plane and a main light outputting plane, an intersecting angle between the main light inputting plane and a vertical reference plane being a first angle, an intersecting angle between the main light outputting plane and the vertical reference plane being a second angle, the first angle is about 25-31 degrees and the second angle is about 29-35 degrees to provide a required light incidence angle of the reflection-type image generator and wherein focal distance of the first illumination lens is f1, focal distance of the second illumination lens is f2, the light source module produces a first multiple virtual light sources on an output side of the light beam homogenization means, the first multiple virtual light sources are located within focal distance f1 producing an virtual image of a second multiple virtual light sources on the same side as the first multiple virtual light sources, the second multiple virtual light sources are distanced from the second illumination lens by value of D, wherein the D value has a value according to f2<D<2f2 such that the second multiple virtual light sources are substantially conjugatedly image on the image projection lens set.

8. The projector apparatus of claim 7, wherein the first light source includes LED Green light, the second light source includes LED Red and Blue lights.

9. The projector apparatus of claim 7, wherein the second light source is disposed at a space between the first light source and the image projection lens set.

* * * * *